US009682489B2

(12) United States Patent
Flehmig et al.

(10) Patent No.: US 9,682,489 B2
(45) Date of Patent: Jun. 20, 2017

(54) METHOD AND DEVICE FOR MECHANICALLY REMOVING COATINGS FROM COATED BLANKS USING A PRESS AND SCRAPING KNIFE

(71) Applicants: Thomas Flehmig, Ratingen (DE); Jörg Gorschlüter, Hamm (DE); Stefan Wischmann, Berlin (DE)

(72) Inventors: Thomas Flehmig, Ratingen (DE); Jörg Gorschlüter, Hamm (DE); Stefan Wischmann, Berlin (DE)

(73) Assignee: ThyssenKrupp Steel Europe AG, Duisburg (DE)

( * ) Notice: Subject to any disclaimer, the term of this patent is extended or adjusted under 35 U.S.C. 154(b) by 346 days.

(21) Appl. No.: 14/075,739

(22) Filed: Nov. 8, 2013

(65) Prior Publication Data

US 2014/0060281 A1    Mar. 6, 2014

Related U.S. Application Data

(63) Continuation of application No. PCT/EP2012/058358, filed on May 7, 2012.

(30) Foreign Application Priority Data

May 12, 2011    (DE) .................. 10 2011 050 316

(51) Int. Cl.
*B08B 1/00*    (2006.01)
*B26D 3/28*    (2006.01)
(Continued)

(52) U.S. Cl.
CPC .................. *B26D 3/28* (2013.01); *B08B 1/00* (2013.01); *B21D 19/005* (2013.01); *B23K 26/24* (2013.01);
(Continued)

(58) Field of Classification Search
CPC ........ B23K 26/60; B23K 31/10; B23K 26/00; B23K 26/24; B23K 26/32; B23K 26/322;
(Continued)

(56) References Cited

U.S. PATENT DOCUMENTS 2,136,122 A    11/1938    Almdale
2,720,914 A    10/1955    Doty et al.
(Continued)

FOREIGN PATENT DOCUMENTS

DE    19604942 A1    8/1997
DE    1004770 A1    11/2002
(Continued)

OTHER PUBLICATIONS

Derwent World Patents Index; DWPI 2008-H13550; Westlaw; Week 200846; 3 pages.

*Primary Examiner* — Kenneth E. Peterson
*Assistant Examiner* — Nhat Chieu Do
(74) *Attorney, Agent, or Firm* — Reinhart Boerner Van Deuren P.C.

(57) ABSTRACT

The invention relates to a method for the decoating at least in part of blanks made of metal which are coated on one or both sides in regions, which have a main extension direction, wherein the regions to be decoated can extend in both a straight or curved manner in the main extension direction. The invention further relates to a device for the decoating at least in part of a coated blank in order to carry out the method according to the invention. A method is provided in which the blank is placed on a blank support of a press and during the closing movement of the press at least one scraping knife preferably completely removes the coating of the blank by scraping substantially perpendicular to the main extension direction of the region of the blank to be decoated.

10 Claims, 7 Drawing Sheets

(51) Int. Cl.
  *B21D 19/00* (2006.01)
  *B23K 31/00* (2006.01)
  *B23K 26/32* (2014.01)
  *B23K 26/322* (2014.01)
  *B23K 26/60* (2014.01)
  *B23K 26/24* (2014.01)
  *B23K 101/18* (2006.01)
  *B23K 101/34* (2006.01)
  *B23K 103/00* (2006.01)

(52) U.S. Cl.
  CPC .......... *B23K 26/32* (2013.01); *B23K 26/322* (2013.01); *B23K 26/60* (2015.10); *B23K 31/00* (2013.01); *B23K 2201/18* (2013.01); *B23K 2201/34* (2013.01); *B23K 2203/50* (2015.10); *Y10T 83/023* (2015.04); *Y10T 83/0296* (2015.04)

(58) Field of Classification Search
  CPC .......... B23K 2201/18; B23K 2201/34; B21D 19/005; A47L 13/02; Y10T 83/023; Y10T 83/0296; B08B 1/00; B26D 3/28
  USPC ........ 83/52, 554, 51; 156/717–718; 15/93.4, 15/179, 236.01, 256.51; 29/81.11; 427/444
  See application file for complete search history.

(56) References Cited

U.S. PATENT DOCUMENTS

| | | | | |
|---|---|---|---|---|
| 4,108,029 A | * | 8/1978 | Borzym | B23D 21/00 83/300 |
| 5,361,489 A | * | 11/1994 | Vatel | H02G 1/127 29/825 |
| 5,439,272 A | | 8/1995 | Hallet et al. | |
| 5,626,396 A | | 5/1997 | Kuragano et al. | |
| 7,971,303 B2 | * | 7/2011 | Prasad | B23D 79/02 15/93.4 |
| 2009/0155615 A1 | * | 6/2009 | Chen | B21D 35/00 428/593 |

FOREIGN PATENT DOCUMENTS

| | | |
|---|---|---|
| DE | 10142981 A1 | 3/2003 |
| DE | 102 47 129 A1 | 4/2004 |
| DE | 102004048350 A1 | 4/2006 |
| DE | 102004048351 A1 | 4/2006 |
| DE | 102005044221 A1 | 3/2007 |
| DE | 102008006624 A1 | 7/2009 |
| DE | 202007018832 U1 | 9/2009 |
| EP | 0590237 A1 | 4/1994 |
| EP | 1186516 A1 | 3/2002 |
| GB | 2297687 A | 8/1996 |
| JP | 05-092273 A | 4/1993 |
| JP | 06070827 A | 3/1994 |
| JP | 06205716 A | 7/1994 |
| JP | 08112160 A | 5/1996 |
| JP | 10-225770 A | 8/1998 |
| JP | 2000198029 A | 7/2000 |
| JP | 2004148326 A | 5/2004 |
| JP | 2006051272 A | 2/2006 |
| JP | 2009-160601 A | 7/2009 |
| WO | WO 2004/086909 A1 | 10/2004 |
| WO | WO 2008/131228 A2 | 10/2008 |
| WO | WO 2009/066533 A1 | 5/2009 |

* cited by examiner

METHOD AND DEVICE FOR MECHANICALLY REMOVING COATINGS FROM COATED BLANKS USING A PRESS AND SCRAPING KNIFE

CROSS-REFERENCE TO RELATED PATENT APPLICATIONS

This patent application is a continuation of PCT/EP2012/058358, filed May 7, 2012, which claims priority to German Application No. 102011050316.1, filed May 12, 2011, the entire teachings and disclosure of which are incorporated herein by reference thereto.

FIELD OF THE INVENTION

The invention relates to a method for the decoating at least in part of blanks made of metal which are coated on one or both sides in regions which have a main extension direction, wherein the regions to be decoated can extend in both a straight or curved manner in the main extension direction. The invention further relates to a device for the decoating at least in part of a coated blank in order to carry out the method according to the invention.

BACKGROUND OF THE INVENTION

To an increasing extent, high strength and super high strength steels are used for example in the automotive industry, as said steels can be provided with lower wall thicknesses resulting in weight advantages. In order to form this material, hot forming is particularly suitable, which however requires additional coating of the blank so that these do not scale in the hot forming tool. An AlSi coating is frequently used. This effectively prevents the scaling of the blank during hot forming, in which the blank is heated at least to austenitising temperature. What is problematic when welding blanks coated in this way is that the components of the coating, in particular aluminium, penetrate the weld region and in the case of hot forming with subsequent press hardening lead to a lack of strength in the welded joint. The regions necessary for the decoating of the blanks have a main extension direction, namely in the direction of the welded seam.

The width of the regions is preferably limited to a maximum of 5 mm as otherwise the absence of the coating in these regions would in turn have negative consequences.

There are now various options to remove a coating, in particular an AlSi coating but also any other coating in the region of the welded seam from the blank before welding. These can be divided into thermal, chemical and mechanical methods.

For example, it is known that the coating in the desired regions can be removed by etching with acid. However, this is very time-consuming as the remaining regions of the blank on which the coating is to remain have to be masked or covered.

In terms of mechanical methods, longitudinal planning or milling of the coating have been attempted to date. However, both methods are very time-consuming and cost-intensive as the regions of the blank provided for the welded seams have to be worn down separately. In other words, the regions have to be shaved or milled along their main extension direction.

Furthermore, tests have been carried out which process the affected positions using sandblasting. As a disadvantage, it has been determined that parts of the coating, in particular aluminium, are pressed into the substrate.

A further method is described in the prior art in which the coating is removed by means of high frequency electromagnetic fields (DE 10 2008 006 624 A1). This method has yet to become established.

The evaporation of the coatings in these regions using a pulsed laser continues to be used. From the German utility model DE 20 2007 018 832 U1, for example, it is known not to completely remove the coating but rather to leave an intermediate layer known as the inter-metallic intermediate layer, on the substrate, which protects the decoated region from corrosion at least for a time-limited period. This inter-metallic intermediate layer further contains components of the coating such as aluminium. The remaining parts of the coating, for example aluminium, can then penetrate the welded seam. Furthermore, removing the coating using a laser is relatively time-intensive as the entire region has to be decoated along its main extension direction.

A mechanical method for removing the coating in the region of welded seams is further known from German utility model DE 20 2007 018 832 U1 in which the coating is removed mechanically using brushes. Again the disadvantage is that the entire welded seam has to be worn down with the brushes in order to decoat said welded seams over the entire length. In addition to this, when using the brushes it is not possible to ensure that the coating has been removed completely. All of the previously mentioned methods to remove the coating are very time-consuming and therefore result in relatively high costs.

On this basis, the object of the present invention is to provide a method which is as simple as possible and a device which is as simple as possible with which the coating of a blank can be removed effectively and cost-efficiently in one operation if possible.

SUMMARY OF THE INVENTION

In accordance with a first teaching of the present invention, the above mentioned object for a method is achieved by the blank being placed on a blank support of a press and during the closing movement of the press at least one scraping knife preferably completely removes the coating on the blank by scraping in a direction substantially perpendicular to the main extension direction of the region of the blank to be decoated.

In contrast to the previously known mechanical methods, the removal of the coating of the blank does not take place in a longitudinal direction of the region to be decoated, but rather substantially perpendicular to its main extension direction using a press. Presses are generally frequently used devices for the processing of blanks, so existing devices can be used for the method according to the invention. The decoating is carried out in the press by a working stroke of the press, similarly to a forming process. Low cycle times are achieved in this way, so when decoating for example blanks which are coated on both sides considerable time advantages are achieved. Since the regions to be decoated are substantially decoated perpendicular to their main extension direction, the scraping knife only requires short pathways, for example up to 5 mm, which can be passed through in a very short time. The dimensions of the regions to be decoated may also be larger locally depending on the application. In addition to this, there is no inter-metallic phase, so that particularly good welding results are achieved.

The method according to the invention is therefore preferably developed by the decoating taking place to provide a welding region, in particular a welded seam region. Thicknesses of more than 0.04 mm are preferably removed during decoating, so that the scraping knife can be used in a particularly reliable manner.

In accordance with a further embodiment of the method according to the invention, the blank is decoated at the edge regions. In this manner, edge regions of the blank can easily be provided which are necessary to join it to other blanks, for example to provide a "tailored blank". All edge regions of the blank are preferably decoated using the method according to the invention, so that the blanks can be joined to a further blank at all edge regions by means of a welded seam.

Of course regions of the blank can also be decoated at least in part which are at least in part not localised in edge regions. This ensures that these regions can be joined to other sheet metals by means of welding, so that local strengthening can be arranged and so-called "patchwork blanks" can be provided. Furthermore, the at least in part decoated regions which for example are localised within a blank can also be used to join other components before and/or after forming, for example in vehicle body construction.

In accordance with a next embodiment of the method according to the invention, the decoating on both sides is carried out in one work step. To this end, a plurality of scraping knives are provided on both sides of the blanks which carry out a scraping of the region to be decoated substantially perpendicular to its main extension direction by means of the closing movement of the press. In this way, the decoating of blanks which are coated on both sides is made considerably easier. The decoating on both sides can advantageously be designed such that the decoating takes place on both sides of the blank simultaneously.

If a blank which is provided for hot forming is decoated at least in part, it can be welded to further blanks and/or parts without the welded seam tending to cause strength problems in the subsequent hot forming process.

In accordance with a next embodiment of the method according to the invention, a cut is made following the decoating at least in part of the blank, which is optionally carried out in the same work step in the press. The blanks, which have decoated regions after decoating, can be cut at said decoated regions so that in turn edge regions can be provided which are particularly suitable for welding. However, the cutting of the blank can also be carried out in the same press, and preferably in the same work step. This makes the manufacture of blanks which are suitable for welding significantly easier.

According to a further embodiment of the method according to the invention, for the decoating process the scraping knives are actively driven or forcibly actuated. Active driving of the scraping knives, for example by means of hydraulic or servo-electric means, enables maximum flexibility in terms of the point at which the decoating is carried out. However, the decoating is carried out in a particularly simple manner by forcibly actuated scraping knives which use the movements of the press to move the scraping knives, driven for example by means of a form lock, in order to decoat the blank in the desired region. Corresponding forcible actuating means have a particularly simple structure and are particularly process-reliable.

In accordance with a next embodiment of the method according to the invention, the regions of the blank which are to be decoated, in particular of a blank to be welded to other blanks in the edge joint, have a width of 0.2 mm to 5 mm, preferably a width of 0.8 mm to 1.4 mm. These widths are generally used to provide sufficient decoated blank material so that when generating a welded seam on these regions, in which laser beam welding is generally used, no undesirable coating components remain in the welded seam.

In accordance with a second teaching of the present invention, the above mentioned object of providing a device to carry out the method according to the invention is achieved in that the device comprises a press with an upper tool, a lower tool, a blank support, a pressing table, at least one scraping knife and means to move the at least one scraping knife substantially perpendicular to the main extension direction of the region of the blank to be decoated in order to decoat this region.

According to the invention, therefore, a press with an upper tool and a lower tool is used to decoat the blank using a scraping knife. In this way, the investment costs can be reduced, as the device according to the invention can be realized using existing systems. Furthermore, the movement of the scraping knife substantially perpendicular to the main extension direction of the region of the blank to be decoated enables a short cycle time and therefore a more economic decoating of the blank. Furthermore, the movement of the scraping knives can be provided by the closing movement of the press. Decoating of the blank in the regions provided for the welded seams is therefore carried out in a single working stroke and in this respect is particularly economical.

If the means for moving the at least one scraping knife comprise forcible actuation to guide a scraping knife or a plurality of scraping knives, simple means can be used to transform the closing movement of the press into a movement of the scraping knife, wherein the enormous forces provided by the press can be used at the same time. In comparison to actively driven scraping knives, for example servo-electrical or hydraulically driven scraping knives, a forcible actuation, which is generally carried out by means of a form lock, is particularly simple and process-reliable.

According to a further embodiment of the device according to the invention, at least one scraping knife in the upper tool and at least one scraping knife in the lower tool and scraping knife guides allocated to each scraping knife are provided, wherein the scraping knife guides of the upper tool are form locked to the scraping knife guides of the lower tool during the closing process of the press and the scraping knife guides of the lower tool are forcibly actuated by means of sleeves of the press which have thrust chamfers such that by means of a closing movement of the press the scraping knives in the upper tool and in the lower tool can be displaced perpendicular to the closing movement. This guarantees that decoating on both sides can also easily be carried out by means of forcibly actuated scraping knives on both sides of the blank.

If the press additionally has a cutting and/or punching stamp which cuts or punches the blank at least in part in the decoated regions, it is possible for the blank to be decoated in the regions thereof which are to be decoated and simultaneously to be cut in these regions in one working stroke, such that in one working stroke a blank which can be welded at the decoated regions can be provided.

In accordance with a further embodiment of the device according to the invention, a centrally-arranged compression stamp is provided in the upper and/or lower tool, which compression stamp compresses the blank onto the blank support during decoating. The use of this compression stamp ensures that the blank remains stationary during decoating. This means that the decoating can be designed in a process-reliable manner.

If the scraping knives provided in the upper and/or lower tool and the associated scraping knife guides form the blank support, wherein extensions are provided on the compression stamp and on the lower tool which extend through the scraping knife guides and have direct contact with the blank, in accordance with a further embodiment of the invention this enables the blank to be pressed firmly against the lower tool by means of the compression stamp and simultaneously the movement of the scraping knives to be decoupled from the forces exerted by the press on the blank. Furthermore, the use of the scraping knife guides at the same time as blank support enables that the scraping knives can also be used as cutting edges for the cutting and/or punching stamp, such that following to a successful scraping the stamp only has to be guided along the scraping knife or the scraping knife guides to cut the blank. As a result, a very clean cut of the blanks can also be achieved in the decoated region.

If in each case two opposing scraping knives are arranged on each side of the blank to be decoated, a blank can easily be decoated on both sides on two edge regions, in other words in four regions at once. This arrangement of the scraping knives reduces the amount of time required for decoating considerably, since this device enables decoating on four regions at the same time in one working stroke.

It is also conceivable that two blanks to be welded can be decoated in one tool on the four sides to be decoated simultaneously, for example in one working stroke or in one working stroke sequence, and in this way a decoated, weldable pair of blanks is created, wherein preferably the two blanks have different thicknesses.

BRIEF DESCRIPTION OF THE INVENTION

The invention shall be described in greater detail below using exemplary embodiments in combination with the figures, in which.

DETAILED DESCRIPTION OF THE INVENTION

Figure 1:
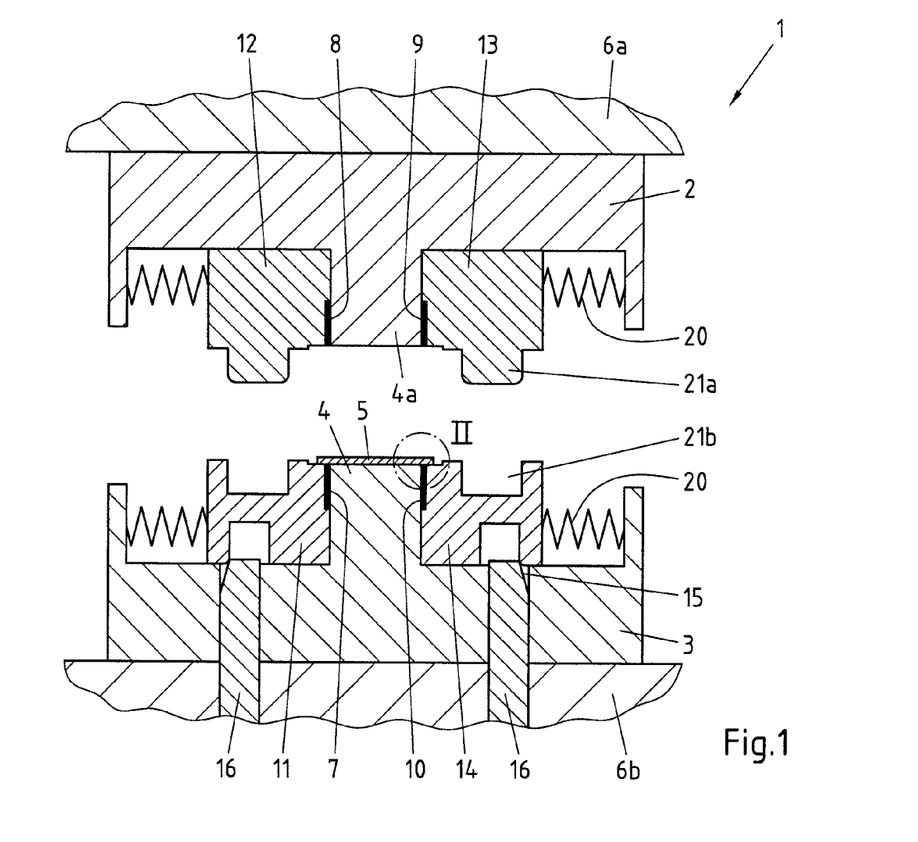
FIG. 1 is a schematic sectional view of a first exemplary embodiment of a device according to the invention for the decoating at least in part of a coated blankdecoat.

FIG. 1 shows a first exemplary embodiment of a press 1 for decoating a blank 5 having an upper tool 2, a lower tool 3, a blank support 4, a press stamp 6a and a pressing table 6b. The blank support 4 is arranged in the lower tool 3. In the upper tool 2, a counterholder 4a is provided opposite the blank support 4 to impact the blank 5 with a retention force. Each two scraping knife guides 11, 14 and 12 and 13, which guide the scraping knives 7, 8, 9 and 10, are arranged in pairs and mirror-symmetric to one another in the upper and lower tools 2, 3. The scraping knife guides 11, 12, 13 and 14 are impacted with a force by means of compression springs 20 such that the scraping knife guides press against the blank supports and are held in the scraping position.

FIG. 1 further shows sleeves 16 of press 1 which have thrust chamfers 15 at their ends which are used to forcibly actuate the scraping knife guides 11, 14. In order for the scraping knife guides 12, 13 of the upper tool 2 to also be forcibly actuated synchronously to the scraping knife guides 11, 14 of the lower tool 3, said scraping knife guides have protruding regions 21a which penetrate into recesses 21b of the scraping knife guides 11, 14 when the upper and lower tools 2, 3 are closed. In this case, scraping knife guides 11 and 12 and 14 and 13 are form-locked to one another.

Figure 2:
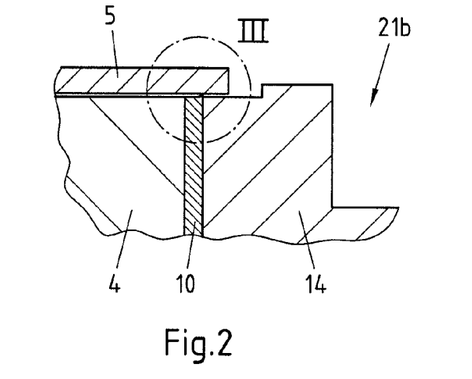
FIG. 2 is a detailed view of the scraping knife guide of the exemplary embodiment represented in FIG. 1.
Figure 3:
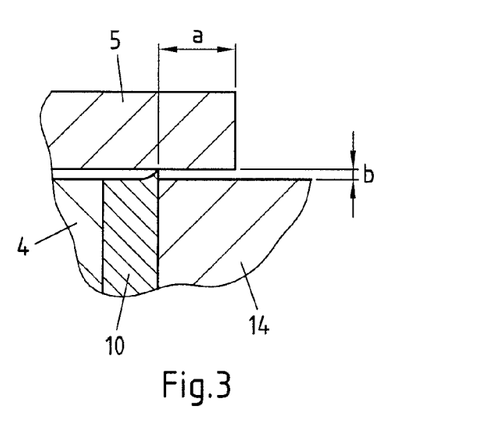
FIG. 3 is a detailed view of the scraping knife and the blank of the exemplary embodiment represented in FIG. 1.

A detailed view of the scraping knife guide 14 and the scraping knife 10 and the blank 5 in the exemplary embodiment represented in FIG. 1 is shown in FIG. 2. It should be noted that the blank 5 lies on the scraping knife 10. This is better demonstrated in FIG. 3. From this figure, it is possible to recognise that preferably curved scraping knives 10 are used in the exemplary embodiment shown. The width of the region to be decoated is approximately 1.2 mm in the present embodiment. In order to achieve a good result when decoating, it has been shown that it is advantageous if the scraping knife has a projection b of at least 0.04 mm.

Figure 4:
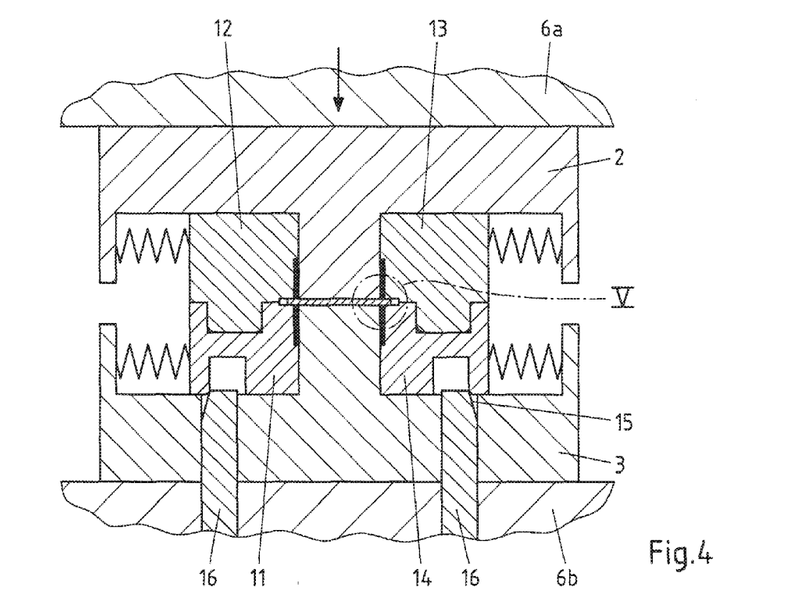
FIG. 4 is a schematic sectional view of the exemplary embodiment represented in FIG. 1 with the upper and lower tools closed.
Figure 5:
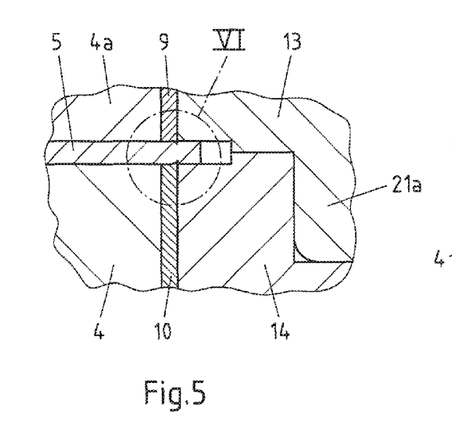
FIG. 5 is a detailed view of the scraping knife guide represented in FIG. 4.
Figure 6:
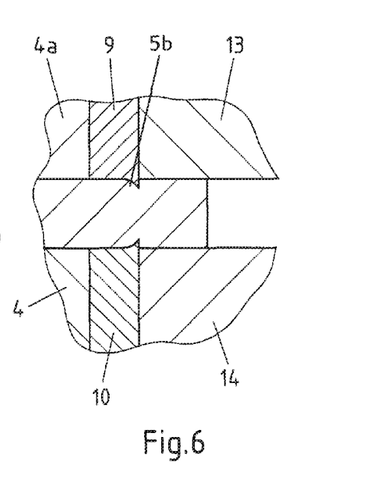
FIG. 6 is a detailed view of the scraping knife represented in FIG. 5.

FIG. 4 shows the exemplary embodiment from FIG. 1 schematically in a sectional view at the point at which the upper tool 2 is retracted into the lower tool 3. The scraping knife guides 12, 13 are then coupled to the scraping knife guides 11 and 14 in a form lock. The scraping knife guides 11, 12, 13, 14 and therefore also the scraping knives 7, 8, 9, 10 are held in position by the compression springs 20 such that no lateral movement of the scraping knives 7, 8, 9, 10 occurs. The blank support 4 is pressed against the blank 5 by the pressure of the press stamp 6a and the scraping knives are inserted into the coating 5b (see FIG. 6) of the blank to be decoated with their cutting edges. The position of the scraping knives 9, 10 when the upper and lower tools 2, 3 are closed is shown in FIG. 5. In the exemplary embodiment shown, decoating on both sides can take place as the scraping knives 9, 10 touch both the upper face and the lower face of the blank 5. This is shown in an even clearer manner in FIG. 6, which shows the region of the intrusion of the scraping knives 9, 10 into the blank 5 to be decoated. When the upper and lower tools 2, 3 are closed, the scraping knives, 9, 10 penetrate the blank 5, in particular the coating thereof.

The sleeves 16 are then moved out of the press or the pressing table 6b is lowered relative to the sleeves. As a result, the sleeves 16 forcibly displace the scraping knife guides 11, 14 of the lower tool outwards by means of their thrust chamfers 15 and the scraping knives 7, 10 decoat the region of the blank to be decoated transverse to the main extension direction thereof. Due to the form lock between the scraping knife guides 11, 14 of the lower tool 3 and the scraping knife guides 12, 13 of the upper tool 2, the movement of the scraping knife guides 12, 13 and therefore the scraping knives 8, 9 is identical. These scraping knives are also forcibly displaced outwards resulting in a decoating of the blank by a movement of a scraping knife 8, 9 substantially perpendicular to the main extension direction of the region to be decoated.

Figure 7:
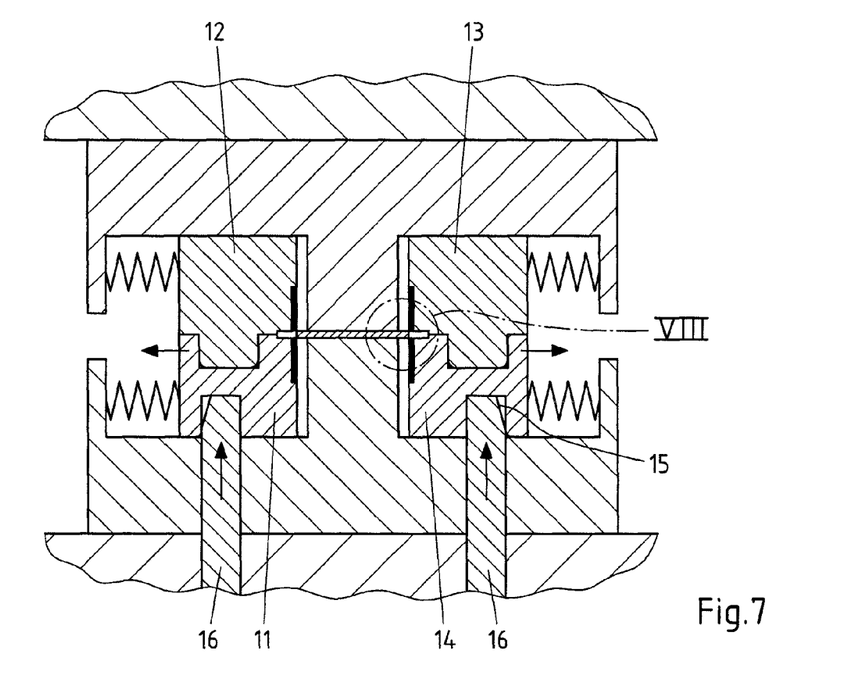
FIG. 7 is a schematic sectional view of the exemplary embodiment represented in FIG. 1 following decoating of the blank.

In FIG. 7, the decoating process is already complete as the sleeves are fully inserted into a recess of the scraping knife guides 11, 12 and the thrust chamfers 15 are completely worn down by the scraping knife guides 11, 14.

Figure 8:
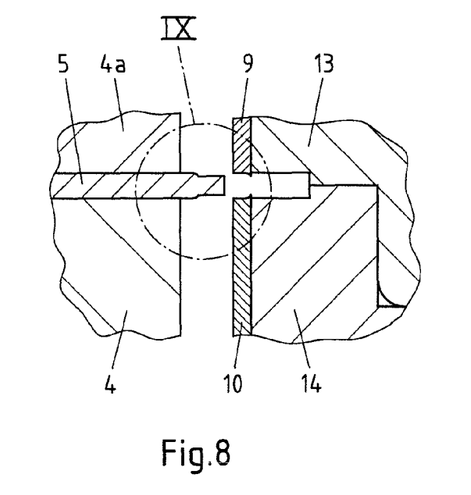
FIG. 8 is a detailed view of the scraping knife guide represented in FIG. 7.
Figure 9:
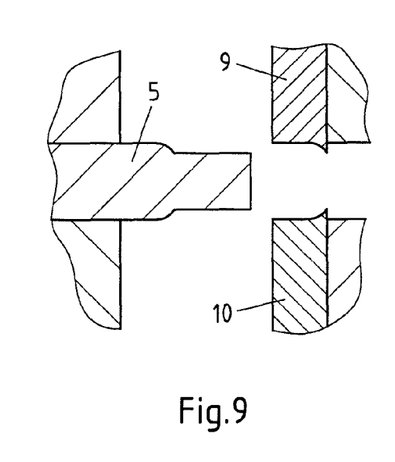
FIG. 9 is a detailed view of the scraping knife and the decoated region of the blank represented in FIG. 8.

FIG. 8 is a detailed view of the position of the scraping knives 9, 10 after completion of the decoating process according to FIG. 7. It should be noted that the scraping knives 9, 10 have already released the blank. FIG. 9 is a detailed view of the decoated region of the blank 5. The blank 5 is decoated on both sides in this region.

However, it is also conceivable for the scraping knives to be used on just one side of the blank. However, the blanks are generally welded on their edges, so decoating of the edges on both sides is often necessary.

Figure 10:
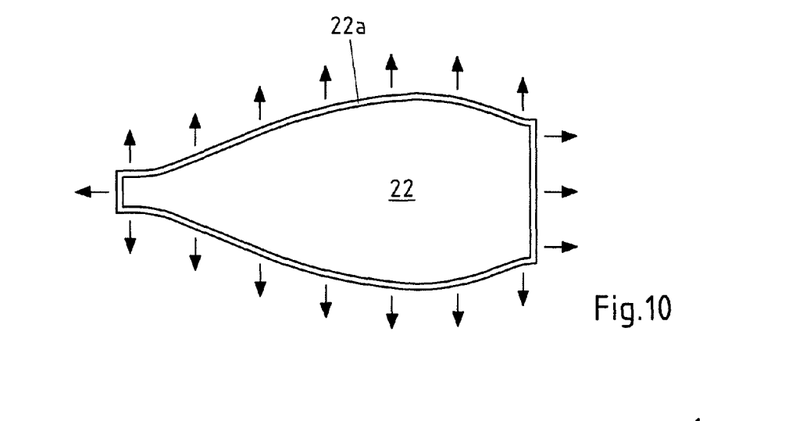
FIG. 10 is a top view of a blank and the regions to be decoated.

FIG. 10 is a top view of a blank 22. The blank has a circumferential region 22a to be decoated which has been decoated using a device according to the invention. The directions of the arrows show the direction of movement of the scraping knives which have been used to decoat the blank 22. It can easily be conceived that with a movement which is so short (a few millimetres) the scraping process or the decoating process occurs correspondingly rapidly and therefore can lead to very low cycle times.

Figure 11:
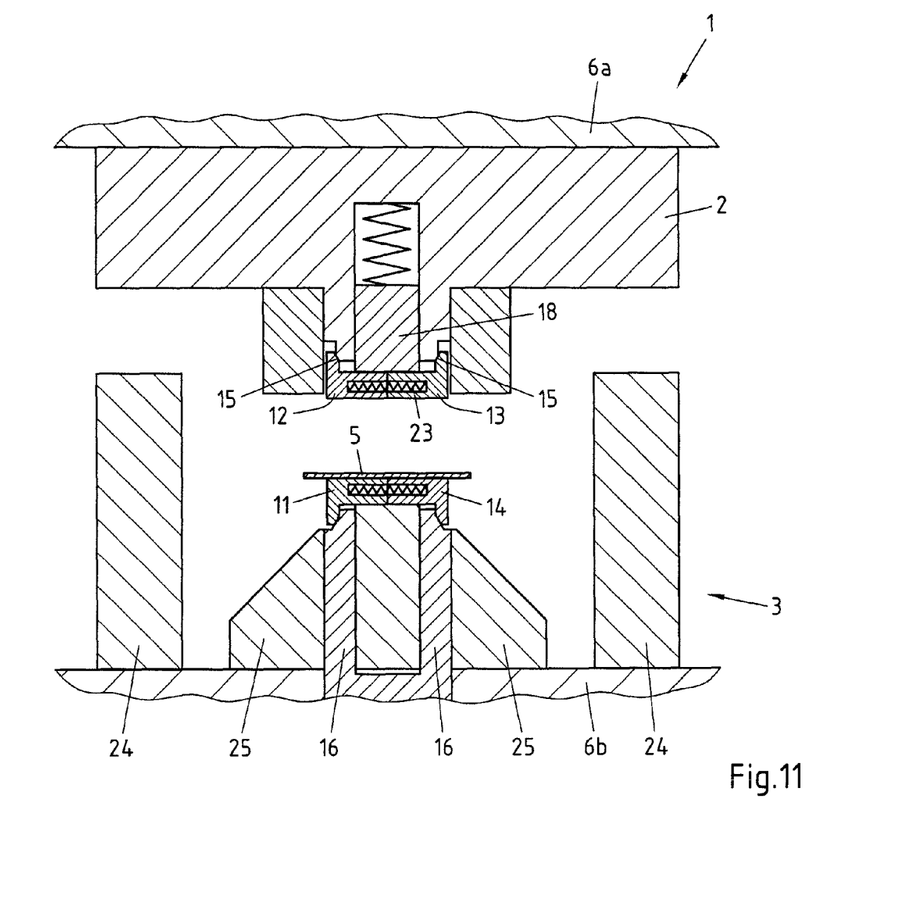
FIG. 11 is a schematic sectional view of a second exemplary embodiment of a device according to the invention for decoating and cutting a blank when open.

FIG. 11 now shows a second exemplary embodiment of a device for decoating a blank comprising a press 1 which has a press stamp 6a and a pressing table 6b. The scraping knife guides 11, 12, 13 14 of the exemplary embodiment represented in FIG. 11 now simultaneously form the blank support and are each held in pairs at the decoating position or initial position by means of tension springs. Furthermore, the exemplary embodiment represented in FIG. 11 also has an end stop position block 24 and a scrap chute 25. The scrap chute 25 serves to guide away the cutting remnants which occur during cutting of the blank 5 in a controlled manner. The end position block 24 delimits the path of the press stamp 6a.

In the lower tool 3 of the second embodiment, sleeves 16 are further provided which have thrust chamfers or thrust wedges 15 which are used to forcibly actuate the scraping knife guides 11, 14. In contrast to the exemplary embodiment represented in FIG. 1, the second exemplary embodiment of the device according to the invention also has thrust chamfers or thrust wedges 15 in the upper tool 2. A compression stamp 18 is further provided, which has direct contact with the blank by means of extensions 19 leading through the scraping knife guides 12, 13 which are not shown in FIG. 11. Identical to these extensions 19 in the upper tool 2, extensions 19 are also provided in the lower tool 3 which transfer the pressure of the compression stamp 18 exerted by the upper tool 2 on the blank to the lower tool 3. The extensions 19 of the lower tool 3 are also not shown in FIG. 11.

Figure 12:
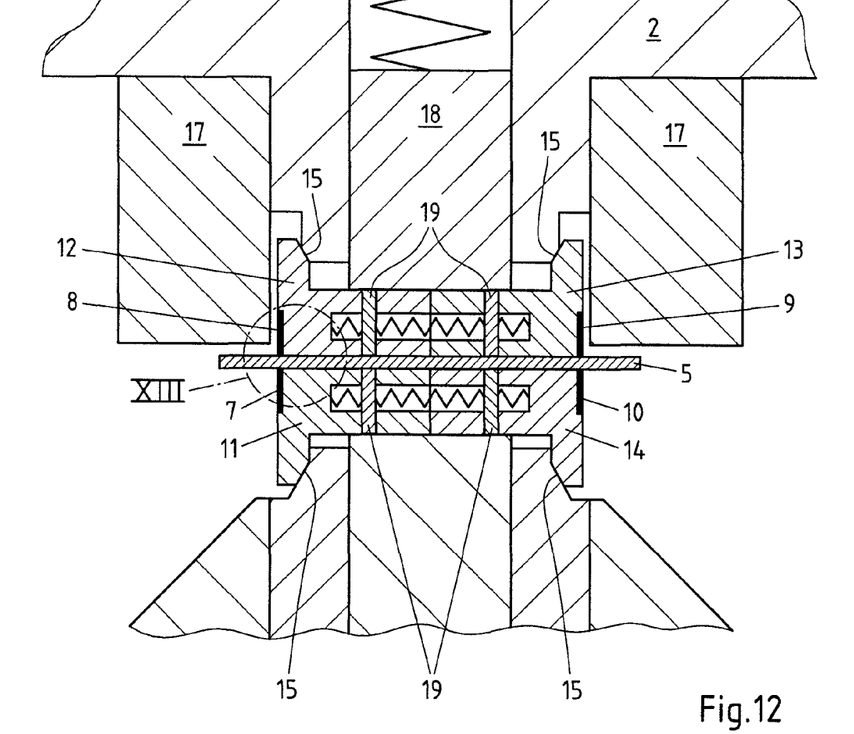
FIG. 12 is the exemplary embodiment represented in FIG. 11 with the upper and lower tools closed.

FIG. 12 shows the second exemplary embodiment at the point at which the upper and lower tools 2, 3 are closed and the scraping knives 7, 8, 9, 10 engage with the blank 5. In this position, the tension springs 23 hold the scraping knife guides 11, 12, 13, 14 together at the initial position. The compression stamp 18 transfers a force onto the blank 5 by means of the extensions 19, which force is passed on to the extensions 19 of the lower tool 3.

This means that the full load of the scraping knives 11, 12, 13, 14 does not lie on the blank 5 and can easily be moved laterally. The thrust chamfers 15 can clearly be seen in FIG. 12, which thrust chamfers are arranged in both the lower tool and the upper tool. At this point, the cutting stamp 17 is still in the initial position and is not engaged with the blank 5.

Figure 13:
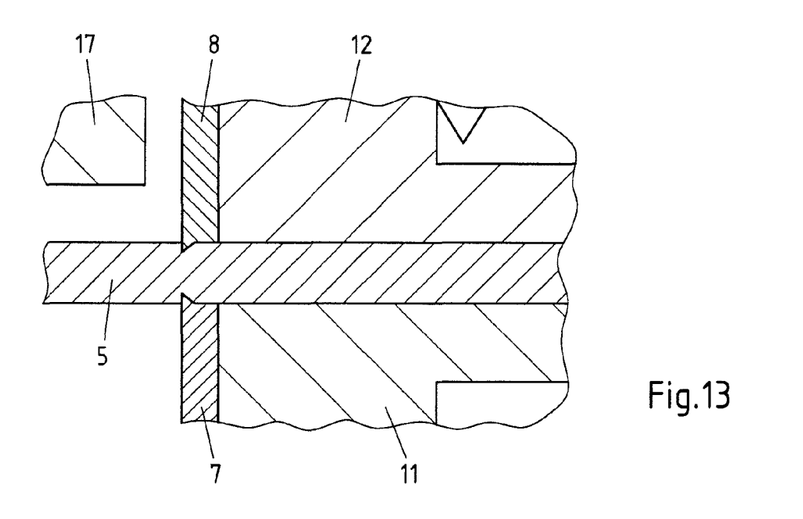
FIG. 13 is a detailed view of the position of the scraping knife represented in FIG. 12.

FIG. 13 is a detailed view of the scraping knife guides 11, 12 including their scraping knives 7, 8. When the upper and lower tools 2, 3 are closed, the scraping knives 7, 8 penetrate the coating of the blank 5.

If the press stamp 6a continues to move closer, the scraping knife guides 11, 12, 13, 14 are displaced outwards by means of the thrust chamfers 15 or thrust wedges 15 against the tensile force of the springs 23 and carry out the scraping process. The scrapping knives decoat the blank 5 in a region which has a main extension. The movement of the scraping knives is generally perpendicular to the main extension direction of the region of the blank 5 to be decoated.

Figure 14:
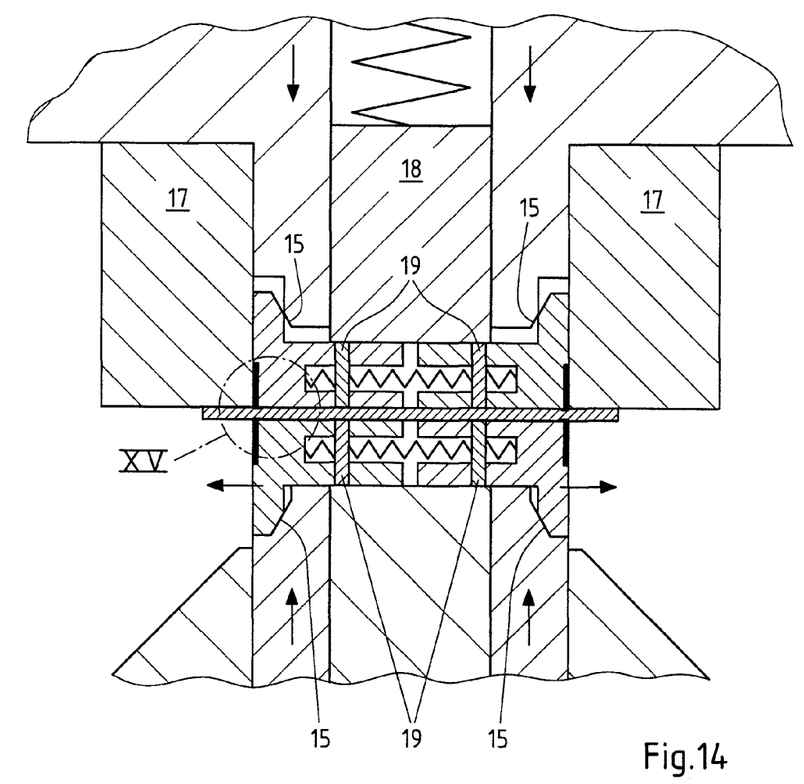
FIG. 14 shows the exemplary embodiment represented in FIG. 11 after decoating and before cutting of the blank.
Figure 15:
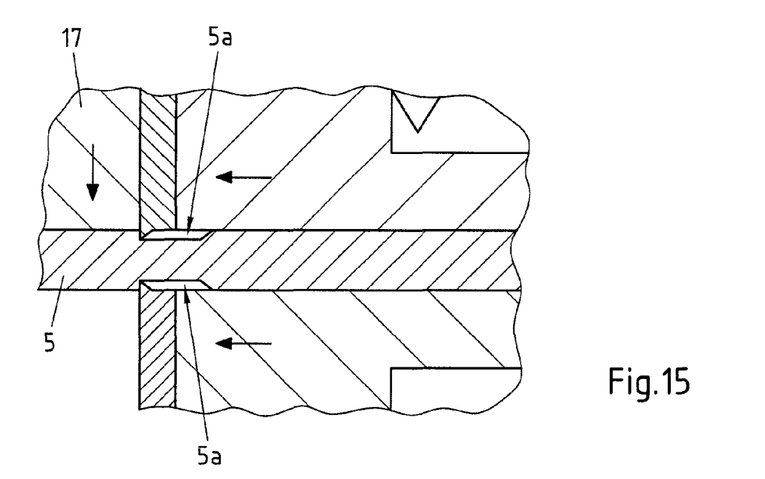
FIG. 15 is a detailed view of the scraping knife represented in FIG. 14 in the region of the decoated blank.

The cutting stamp 17 reaches the cutting position, FIG. 14, after the completion of the decoating. FIG. 15, which is a detailed view of a decoated region of the blank 5 from FIG. 14, clearly shows the start of the cutting process. After completion of the decoating process, the blank has decoated regions 5a. The thrust chamfers have been passed through by the scraping knife guides 11, 12, 13, 14, such that where there is further lowering of the press stamp 6a there is no further lateral movement of the scraping knife guides 11, 12, 13, 14. Only the cutting knife 17 is moved downwards, such that the scraping knife functions as a cutting edge for the cutting or punching stamp 17 at the same time.

Figure 16:
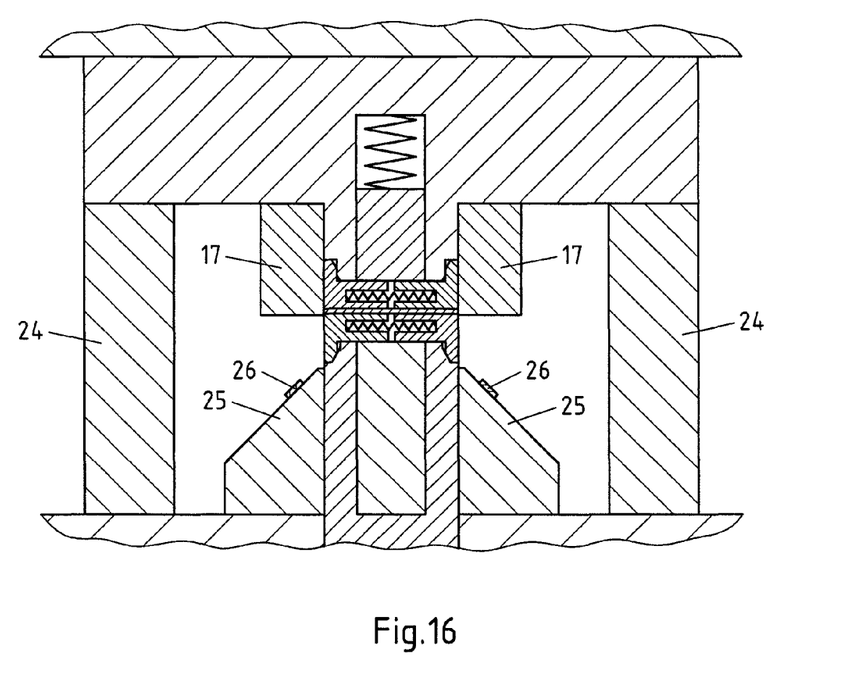
FIG. 16 shows the exemplary embodiment represented in FIG. 11 after cutting of the blank.

FIG. 16 shows the press moved to the end position. The cutting stamp 17 has now cut both sides of the blank 5 and the cutting remnants 26 are moved out of the work area in a controlled manner via the scrap chute 25.

Figure 17:
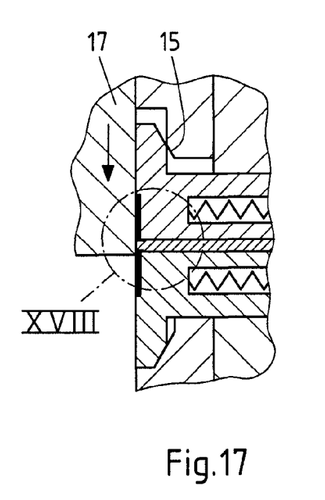
FIG. 17 is a detailed view of the cutting edges and the scraping knife guide of the exemplary embodiment represented in FIG. 11
Figure 18:
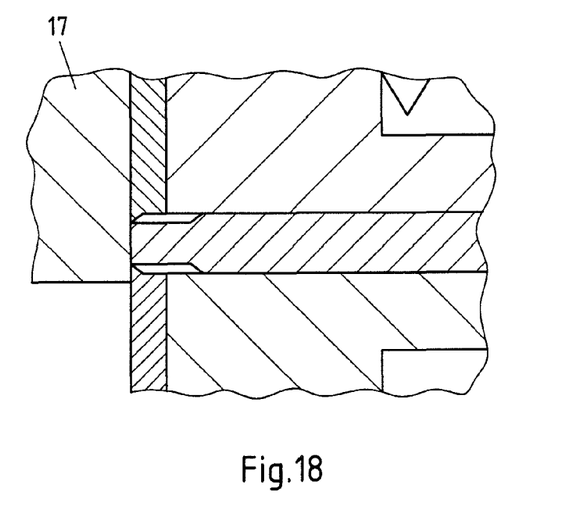
FIG. 18 is a detailed view of the decoated blank immediately after cutting of the blank in the cutting region.

FIG. 17 is a detailed view of the cut region. As can be seen, the thrust chamfers 15 play no further role in the movement of the cutting stamp 17. With the device according to the invention and with the method according to the invention, a blank can easily be provided, the edges of which are decoated and cut in one work step. The above mentioned AlSi coatings are available for the coating. However, it is also conceivable for other coatings to be removed from a blank.

The invention claimed is:

1. A method for the decoating at least in part of blanks made of metal which are coated on one or both sides in regions, which are flat and have a main extension direction in a plane of the blank, wherein the regions to be decoated extend in either a straight or curved manner in the main extension direction, the method comprising:
    providing a blank and
    placing the blank on a blank support of a press and wherein said press has upper and lower tools, the blank support, a pressing table, and at least one scraping knife mounted on at least one of the upper and lower tools,
    lowering the upper tool and simultaneously moving said at least one scraping knife to remove the coating on the blank by scraping substantially perpendicular to the main extension direction of the region of the blank to be decoated and within the plane of the blank.

2. A method according to claim 1, wherein the decoating is carried out to provide a welded region, in particular a welded seam region.

3. A method according to claim 1, wherein the blank is decoated on the edge regions.

4. A method according to claim 1, wherein the decoating is carried out on both sides in one work step.

5. A method according to claim 1, wherein the blank which is decoated at least in part is provided for hot forming.

6. A method according to claim 1, wherein a cut is made following the decoating at least in part of the blank.

7. A method according to claim 6, wherein the cut is carried out during the lowering of the upper tool.

8. A method according to claim 1, wherein the at least one scraping knife is actively driven by driving means or forcibly actuated to carry out the decoating process.

9. A method according to claim 1, wherein the regions of the blank to be decoated have a width of 0.2 mm to 5 mm, preferably a width of 0.8 mm to 1.4 mm.

10. A device for the decoating at least in part of a coated blank, comprising a press with an upper tool, a lower tool, a blank support, a pressing table, at least one scraping knife and means to move the at least one scraping knife substantially perpendicular to a main extension direction of a region of the blank to be decoated in order to decoat this region, wherein the means to move the at least one scraping knife comprises forcible scraping knife guides to guide the at least one scraping knife or a plurality of scraping knives, and wherein at least one scraping knife in the upper tool and at least one scraping knife in the lower tool and forcible scraping knife guides allocated to each scraping knife are provided, the forcible scraping knife guides of the upper tool are form locked to the forcible scraping knife guides of the lower tool during a welding process of the press and the forcible scraping knife guides of the lower tool are forcibly actuated by means of sleeves of the press which have thrust chamfers such that by means of a closing movement of the press the scraping knives in the upper tool and in the lower tool are displaced perpendicular to the closing movement.

* * * * *